US006603628B1

United States Patent
Gillis et al.

(10) Patent No.: US 6,603,628 B1
(45) Date of Patent: Aug. 5, 2003

(54) IN-SITU PRESSURE SENSOR BASED ON READ HEAD RESISTANCE

(75) Inventors: Donald Ray Gillis, San Jose, CA (US); Bernd Lamberts, Cupertino, CA (US); Kris Victor Schouterden, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 09/704,420

(22) Filed: Nov. 1, 2000

(51) Int. Cl.[7] .................. G11B 21/02; G11B 19/02; G11B 27/36; G11B 5/03
(52) U.S. Cl. ..................... 360/75; 360/69; 360/31; 360/66
(58) Field of Search ................ 360/66, 73.03, 360/69, 75, 31, 71, 97.02, 97.03, 25, 78.04, 78.01, 77.02; 318/490

(56) References Cited

U.S. PATENT DOCUMENTS

| | | |
|---|---|---|
| 4,642,715 A | 2/1987 | Ende ........................ 360/97 |
| 5,455,730 A | 10/1995 | Dovek et al. |
| 5,527,110 A | 6/1996 | Abraham et al. |
| 5,764,430 A | 6/1998 | Ottesen et al. ........... 360/73.03 |
| 5,777,815 A | 7/1998 | Kasiraj et al. .............. 360/75 |
| 5,901,001 A | 5/1999 | Meyer et al. ............... 360/25 |
| 6,011,666 A | 1/2000 | Wakamatsu ............... 360/69 |
| 6,067,203 A | 5/2000 | Ottesen et al. .......... 360/73.03 |
| 6,144,178 A | * 11/2000 | Hirano et al. ............. 318/476 |

FOREIGN PATENT DOCUMENTS

EP 0813187 A 12/1997

OTHER PUBLICATIONS

Patent Abstract of Japan, May 29, 1998, Yuji et al., Device and Method for Inspecting Magnetic Head Disk Drive Equipped with Impact Detecting Mechanism Based on Thermal Resistance Signal from Magneto–Resistance Head.
Patent Abstract of Japan, May 22, 1998, Meeks et al.,.

* cited by examiner

Primary Examiner—Andrew L. Sniezek
(74) Attorney, Agent, or Firm—Liu & Liu

(57) ABSTRACT

A magnetic recording disk drive with a magnetoresisitive (MR) read head and a control unit comprising an operating pressure logic function that is responsive to a thermoresistive signal contained in the feedback signal from the MR read head. The thermal conductivity of the air inside of the hard disk drive is effected by the air pressure. Fluctuation in the thermal conductance from the MR read head to its surroundings inside of the hard drive affects the temperature of the MR head, thus affecting the thermoresistivity of the MR read head. Based on a thermoresistive signal, the temperature of the head may be determined, which in turn is applied to determine the pressure, based on a predetermined relationship between the MR read head temperature, internal pressure, and internal operating temperature.

14 Claims, 4 Drawing Sheets

IN-SITU PRESSURE SENSOR BASED ON READ HEAD RESISTANCE

BACKGROUND OF THE INVENTION

1. Field of the Invention

This invention relates in general to storage devices and more particularly to the detection of the pressure in hard disk drives.

2. Description of Related Art

Hard disk drives are magnetic storage devices that contain at least one rotatable magnetic disk, a magnetic recording head for reading data and/or writing data, a slider for supporting the magnetic recording head in proximity to the disk, a suspension assembly for resiliently supporting and biasing the slider against the disk, and a positioning actuator coupled to the recording head/slider/suspension assembly for moving the recording head over the surface of the disk. In some of the conventional magnetic disk drives, the slider rides on a bearing of air above the disk surface when the disk is rotating at its operational speed. The bearing of air is affected by the atmospheric pressure within the hard disk drive and can vary depending on the operating environment conditions. For example, the development of the laptop has resulted in the use of computers in higher and lower pressure locations. Hard disk drives may be placed in service where they are subjected to pressure, temperature, and humidity changes. At low pressure the lift capacity of the slider is reduced, which reduces the air bearing height between the head and disk. This action increases the chances of a hard drive head crash, which is a catastrophical event for the disk drive because it renders it useless.

Prior attempts were made to compensate for changes in the operating atmospheric pressure. Typically, separate sensors have been used to detect changes in different parameters arising from environmental changes to the hard disk drive. U.S. Pat. No. 6,011,666 disclosed the use of different sensors to detect different environmental parameters. The detected information is used for adjusting the rotational speed of the disk and/or controlling the head to carry out seek operations. Assignee's Patent No. 6,067,203 disclosed a method that involved using a dedicated pressure sensor for detecting the operating atmospheric pressure in a hard disk drive to control the rotational velocity of the disk to one of the appropriate discrete disk velocities when the atmospheric pressure reaches a predefined threshold.

There are several disadvantages associated with using a dedicated atmospheric pressure sensor in a hard disk drive practiced in prior art. The dedicated pressure sensor adds to the component cost, requires internal space for mounting, increases risk of component failure, and adds additional electronic circuitry. What is needed is a disk drive with a pressure sensoring capability that does not have any of the disadvantages of prior art disk drives that use a conventional pressure sensor.

SUMMARY OF THE INVENTION

The present invention overcomes the drawbacks of the prior art by applying the changes in thermal characteristics of a magnetic head to determine the operating pressure in an enclosed storage unit. In one particular embodiment, the present invention measures the internal pressure of a hard disk drive, based on the thermoresistive characteristic of a magnetoresisitive (MR) head. A relationship exists between the MR head temperature, internal pressure, and internal operating temperature, with the pressure inversely dependent on head temperature at a given operating temperature.

DETAILED DESCRIPTION OF THE PREFERRED EMBODIMENT

This invention is described in a preferred embodiment in the following description with references to the following figures. While this invention is described in terms of the best mode of achieving this invention's objectives, it will be appreciated by those skilled in the art that variation may be accomplished in view of these teachings without deviating from the spirit or scope of the invention.

Figure 1:
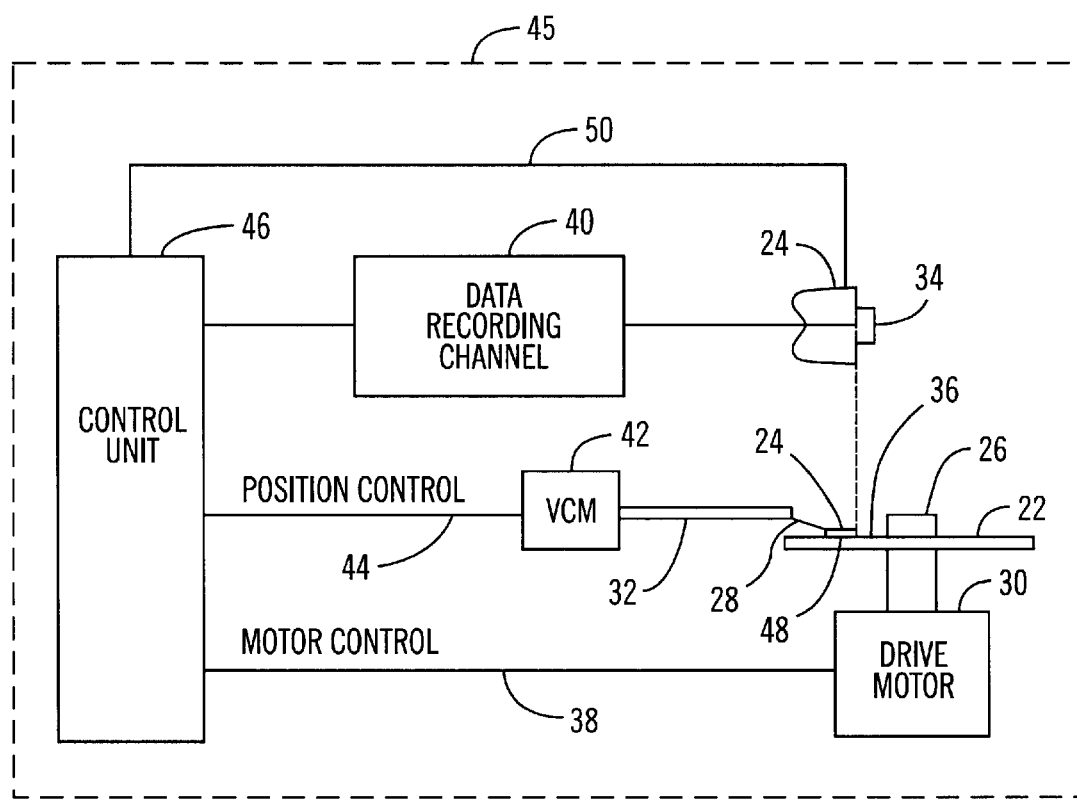
FIG. 1 is a simplified schematic/block diagram of a magnetic disk storage system that incorporates the pressure measurement concept.

FIG. 1 illustrates a simplified schematic block diagram of a magnetic disk storage system embodying the present invention. The magnetic disk storage system comprises at least one rotatable magnetic disk 22 which is supported on a spindle 26 and rotated by a disk drive motor 30, and at least one slider 24 positioned in close proximity to the magnetic disk 22 at the disk surface 36. Data is stored on each disk 22 in the form of an annular pattern of concentric data tracks (not shown). Each slider 24 contains one or more magnetic heads 34 and is attached to a positioner arm 32 by means of an integrated suspension assembly 28. Each positioner arm 32 is attached to an actuator 42 means. The actuator means as shown in FIG. 1 may be a voice coil motor (VCM). As the disk 22 rotates, the slider 24 is controlled to move across the disk surface 36 by the actuator 42 so that the slider 24 may access different portions of the disk surface 36 where desired data is recorded or read. The slider 24 flies in close proximity over the rotating disk surface 36, riding on an air bearing 48 formed between the magnetic heads 34 and the rotating disk surface 36. The integrated suspension assembly 28 provides a slight spring force which biases the slider 24 against the disk surface 36 and controls flexibility in slight vertical as well as roll and pitch movements of the slider 24 relative to the rotating disk surface 36. Line 50 provides feedback of changes in thermoresistivity of the head 34, representing head temperature, to the control unit 46. The various components of the magnetic disk storage system are controlled in operation by control signals generated by the control unit 46, such as drive motor signals of line 38, head position and seek control signals on line 44. The control unit also determines the internal air pressure of a disk drive based on thermal conductivity of the head, in accordance with the present invention as discussed below. Read and write signals are communicated to and from magnetic heads 34 by means of a recording channel 40. All of the components of the magnetic disk storage system are enclosed in housing 45.

Figure 2:
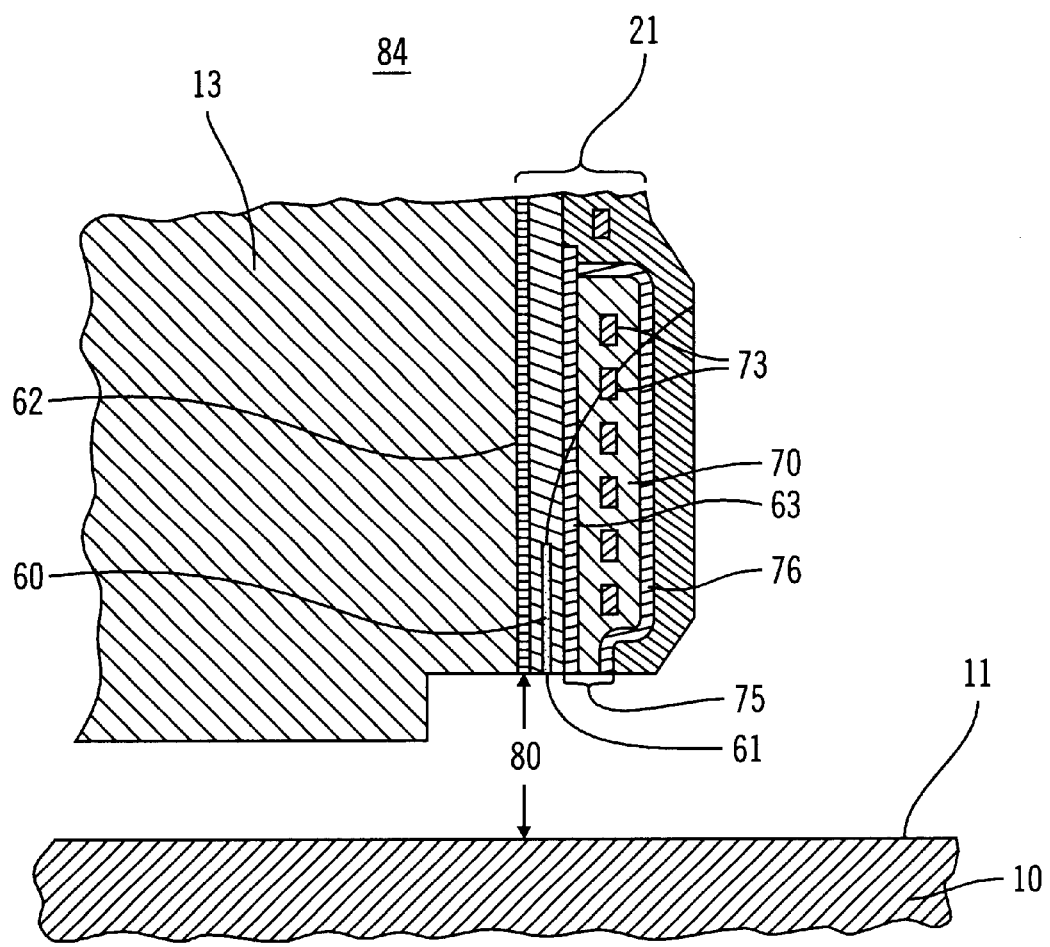
FIG. 2 is a schematic sectional view of a (GMR) giant magnetoresisitive head in relation to a disk in a system incorporating the pressure invention.

FIG. 2 illustrates a sectional view of a portion of the disk 10, GMR read/write head 21, and slider 13. MR head technology is one of the preferred read/write head technologies used in high track density hard disk drives today because of its high sensitivity. The slider 13 contains a write head 70 and a MR read head 60 formed as a thin film head along the shield 62, which is a substrate for the deposition of the film. The MR read head 60 is commonly referred to as a "stripe" of magnetoresisitive material and is located between the deposition shield 62 and a second shield 63. The write head 70 has an inductive coil 73 and a recording gap 75. The recording gap 75 is defined by pole tip 76 and shield 63. The MR read head end 61 and the recording gap 75 are oriented towards the disk surface 11 for reading and writing. In operation, an air bearing exists between the MR read/write head 21 and the rotating surface of the disk 11.

The general operation of the MR read/write head 21 is similar to that described in U.S. Pat. No. 5,777,815, entitled "Disk Drive with Shock Detection Based on Thermoresistive Signal from Magnetoresisitive Head" which is fully incorporated herein by reference. Generally, the resistance of the MR read head 66 varies with changes in the magnetic field of data recorded on the disk 10. A constant bias current is applied by the control unit 46 for determining the resistance changes in the read head 60.

The MR read head 60 temperature ($T_s$) is at a nominal temperature which is greater than the hard disk drive internal ambient operating temperature ($T_a$), because of Joule heating caused by the constant bias current supplied to the MR read head 60. The temperature $T_s$ is determined by the electrical power dissipated in the MR read head 60 and the thermal conductance from the MR read head 60 to its surroundings inside of the hard disk drive. The pressure in the hard disk drive 84 affects the thermal conductance from the MR read head 60 to the surrounding air. When the ambient operating temperature $T_a$ is held constant, an inverse relationship exists between the MR head temperature $T_s$ and internal air pressure 84 within the drive housing, resulting from changes in the thermal conductivity of the air. For example, at a given operating temperature $T_a$, the MR sensor temperature $T_s$ will decrease as the internal air pressure 84 increases, resulting from an increase in thermal conductivity. The exact relationship between temperature $T_s$ and the internal air pressure may be calibrated.

The fluctuations in temperature $T_s$ result in corresponding fluctuations in the MR read head 60 resistance, which gives rise to modulation of the baseline signal from the MR read head 60 at constant bias current. Unlike the readback data signal from the MR read head 60, which is due to the magnetoresisitive effect, this baseline signal modulation is due to a thermoresistive effect. Thus the signal from the MR read head 60 includes, both a magnetoresisitive signal and a thermoresistive signal.

In accordance with the present invention, the thermoresistive signal from the MR read head 60 is used to detect internal air pressure 84 in the hard disk drive. The thermoresistive signal from the MR read head 60 is fed through line 50 to an operating logic function in the controller 46, shown in FIG. 1. The control unit 46 determines internal pressure based on predetermined calibration data correlating $T_s$ or read head thermoresistance, internal pressure and internal operating temperature. Depending on the way the calibration data is correlated, the control unit 46 may first determine temperature $T_s$ based on the thermoresistive signal before applying the calibration data. Separate calibration data may be obtained for different hard drives to account for variation in the internal pressure sensitivity of different MR read heads 60. These separate calibration values include corresponding sensor temperature $T_s$ at various internal air pressure and operating temperature $T_a$, which are stored in the control unit 46.

Figure 3:
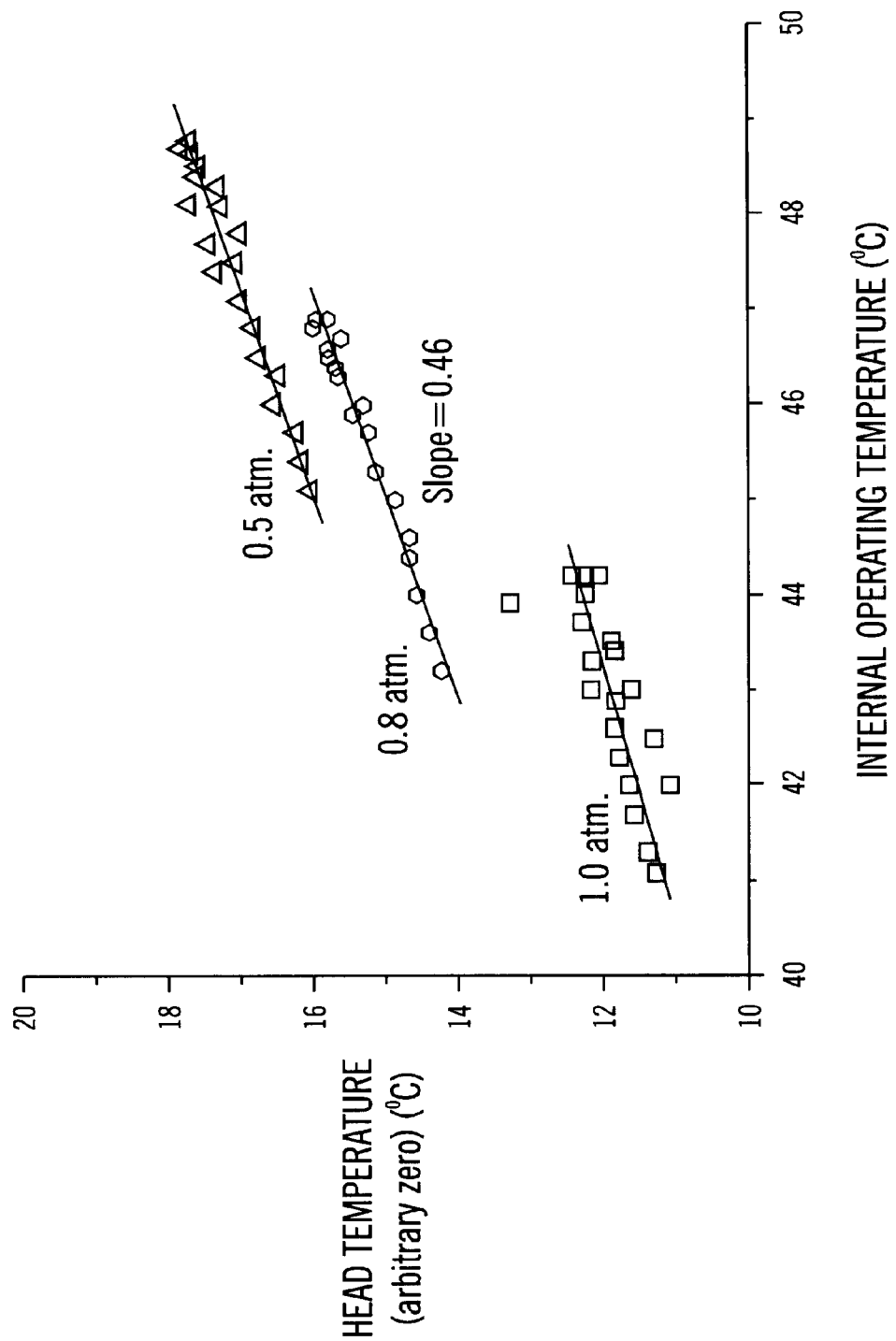
FIG. 3 is a graph of GMR head temperature versus file base temperature at three different internal pressures.

FIG. 3 shows the relationship between the MR read head temperature, internal operating temperature, and internal pressure obtained from calibration. The internal operating temperature is represented on the abscissa and the MR read head temperature (or in the alternative, any signal that represents the read head temperature, such as the thermoresistance of the MR read head) is represented on the ordinate. The MR read head temperature is the temperature above the internal operating temperature. The behavior of MR read head temperature versus operating temperature at three selected pressures were plotted. The internal hard drive pressure was set using a manometer during the experiment and labeled on the graph next to the slope of each series of data points. For example, in one group of data points the internal pressure was set to 0.8 atm and MR head temperature measurements were recorded for an internal operating temperature in the range of approximately 43° C. to 47° C. A line of best fit was determined by linear regression, and the slope was calculated to be 0.46, as shown in the graph. MR head temperatures for two additional internal pressures of 0.5 atm and 1.0 atm were plotted on the graph and the results show a similar correlation to the previous internal pressure. Extrapolation of the results can provide correlation values for additional internal pressure values beyond the three shown on the graph. Accordingly, the internal pressure can be derived from knowing the internal operating temperature and reading the thermoresistive signal.

Figure 4:
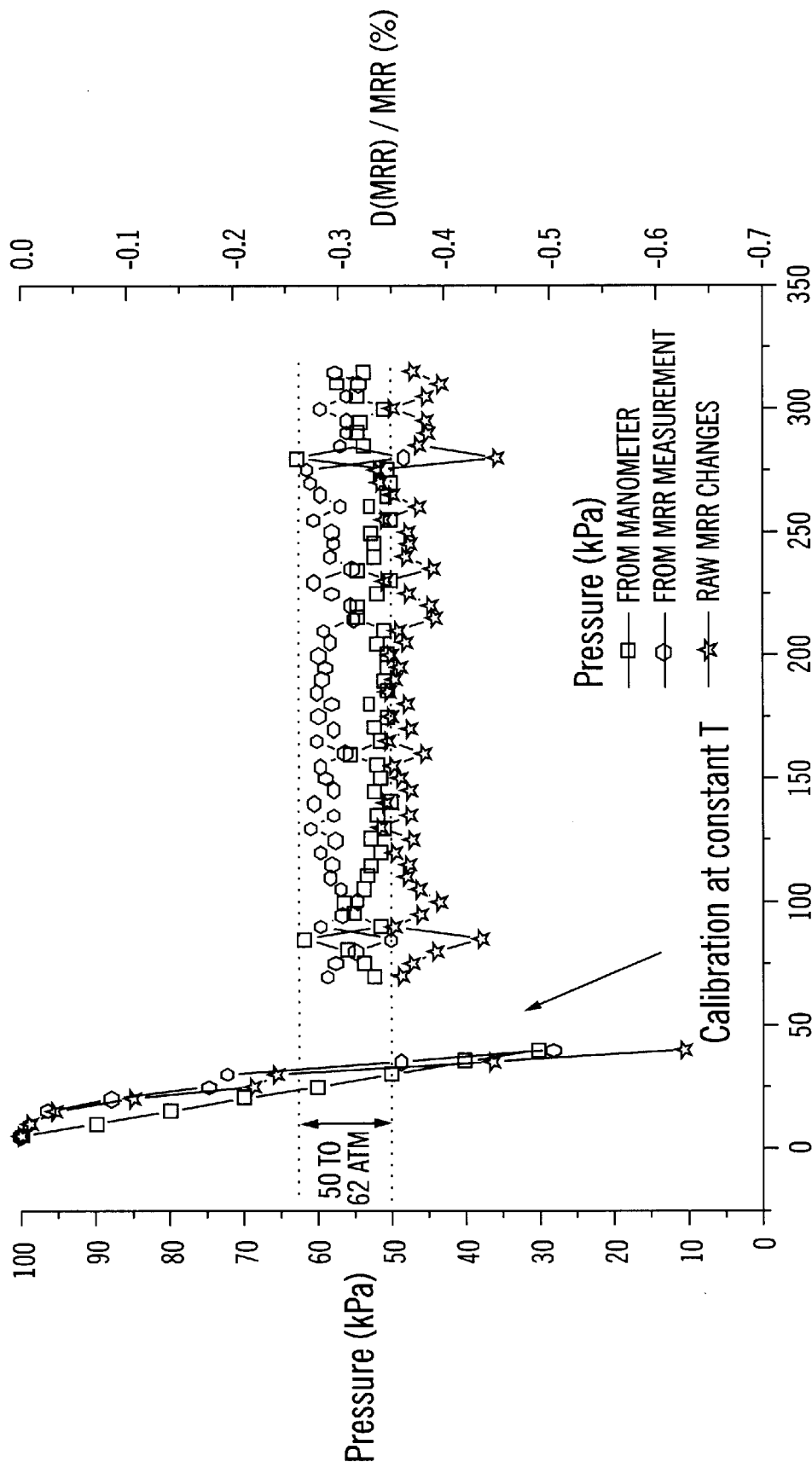
FIG. 4 is a graph showing the correlation between measurements from the thermoresistive characteristic of the GMR head in accordance with the present invention and pressure measurements using a pressure sensor.

FIG. 4 shows the correlation between pressure measurements from a manometer and a MR read head thermoresistive signal. The thermoresistive signal is converted to an equivalent pressure value and is tracked along with the corresponding pressure readings from the manometer for approximately 300 minutes, with the operating temperature of the hard disk drive held constant. Relative changes in the MR read head resistance are also plotted on the graph and are expressed as a ratio:

$$\frac{\Delta MRR}{MRR}$$

where $\Delta$ MRR is the change in the MR read head resistance above the MRR read head base resistance (MRR). The pressure readings from the manometer follow the MR read head resistance changes consistently within a range of approximately 12 KPa. With the internal operating temperature known, the MR read head resistance signal can be used measure the internal pressure in the hard disk drive.

In summary, the present invention provides a method of deriving internal pressure information from a thermoresistance signal under the condition that the internal operating temperature is known. The internal pressure of the hard disk drive can be measured regardless of whether the MR head is operating over the disk surface or parked in a landing zone. By having the ability to measure the internal pressure with the MR head parked, problems such as variations in the air bearing height can be addressed before the MR head makes contact with the disk, resulting in a possible hard drive crash. Although the invention has been described with reference to a hard drive with a MR head, the invention is also applicable to other forms of storage units in which the internal pressure may be determined from a device capable of measuring thermoresistance.

While the present invention has been described with respect to the preferred embodiments in accordance therewith, it will be apparent to those in the skilled art that various modifications and improvements may be made without departing from the scope and spirit of the invention.

Accordingly, the disclosed invention is to be considered merely as illustrative and limited in scope only as specified in the appended claims.

We claim:

1. A storage device, comprising:
   a storage medium operating in an internal environment;
   a motor drive for moving the storage medium;
   a transducer mounted to access the storage medium; and
   a control unit, coupled to receive a temperature dependent signal from the transducer indicative of a pressure of the internal environment in which the storage device is operating, wherein the control unit is configured to determine the pressure based on the temperature dependent signal.

2. A storage device as in claim 1, wherein:
   the transducer has a thermoresistive characteristic,
   the temperature dependent signal represents thermoresistance of the transducer, and
   the control unit is configured to determine the pressure based on the thermoresistive signal.

3. A storage device as in claim 2, wherein the control unit is configured to determine the pressure based on calibration data that correlates thermoresistance of the transducer, temperature of the internal environment, and pressure of the internal environment.

4. A storage device as in claim 3, wherein thermoresistance of the transducer is dependent in part on heat dissipation to the internal environment of the storage device.

5. A storage device as in claim 2, wherein the control unit is configured to determine the pressure based on calibration data that correlates temperature of the transducer, temperature of the internal environment, and pressure of the internal environment.

6. A storage device as in claim 1, wherein the control unit is configured to control one or more operating parameters of the storage device based on the pressure.

7. A storage device as in claim 1, wherein the storage device is a magnetic disk drive system.

8. A storage device as in claim 7, wherein the transducer is a magnetoresistive transducer.

9. A storage device as in claim 8, wherein the control unit applies a bias current to the transducer, which fluctuates depending on thermoresistance of the transducer.

10. A magnetic disk drive system, comprising:
    a housing;
    a magnetic storage medium with a data surface of concentric data tracks positioned in the housing;
    a motor drive for rotating the magnetic storage medium;
    a slider including a read/write transducer maintained in operative relationship with the data surface when the magnetic storage medium is rotating;
    an actuator assembly coupled to the slider for pivotally positioning said slider relative to the magnetic storage medium to selected tracks on the data surface; and
    a control unit for controlling the operations of the motor drive and actuator assembly and processing data read from and written to the data surface, said control unit coupled to receive a temperature dependent signal from the transducer indicative of a pressure in the housing and configured to determine the pressure based on the temperature dependent signal.

11. For a storage device comprising a storage medium and a transducer mounted to access the storage medium, a method of determining pressure of an internal environment of the storage device comprising the steps of:
    providing a temperature dependent signal from the transducer indicative of a pressure of the internal environment in which the storage device is operating; and
    determining the pressure based on the temperature dependent signal.

12. A method as in claim 11, further comprising the step of providing calibration data that correlates thermoresistance of the transducer, temperature of the internal environment, and pressure of the internal environment, wherein the determining step determines pressure based on the calibration data.

13. A method as in claim 11, further comprising the step of providing calibration data that correlates temperature of the transducer, temperature of the internal environment, and pressure of the internal environment, wherein the determining step determines pressure based on the calibration data.

14. A method as in claim 12, further comprising the step of applying a bias current to the transducer, wherein the determining step determines pressure based on fluctuations in the bias current as affected by thermoresistance of the transducer.

* * * * *